Aug. 16, 1932.  A. J. WEATHERHEAD, JR  1,872,536
PIPE COUPLING
Filed Dec. 31, 1930
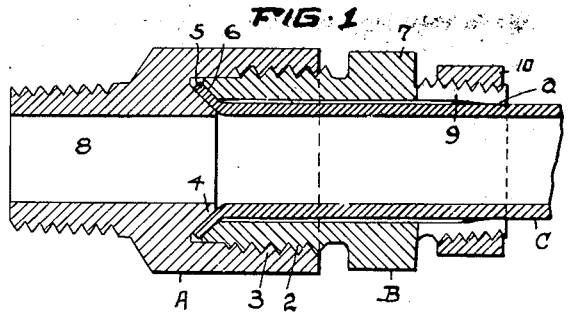
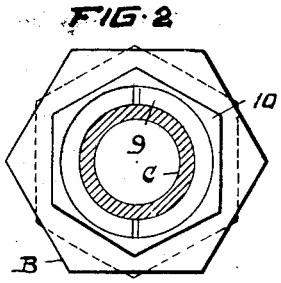
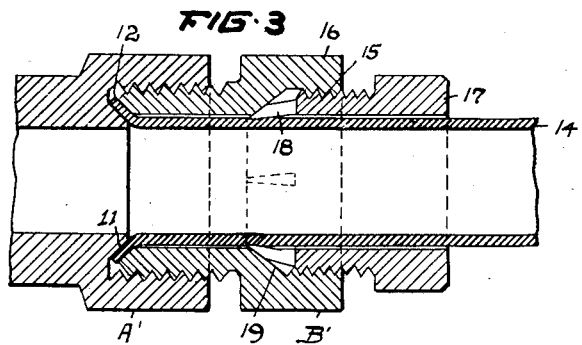
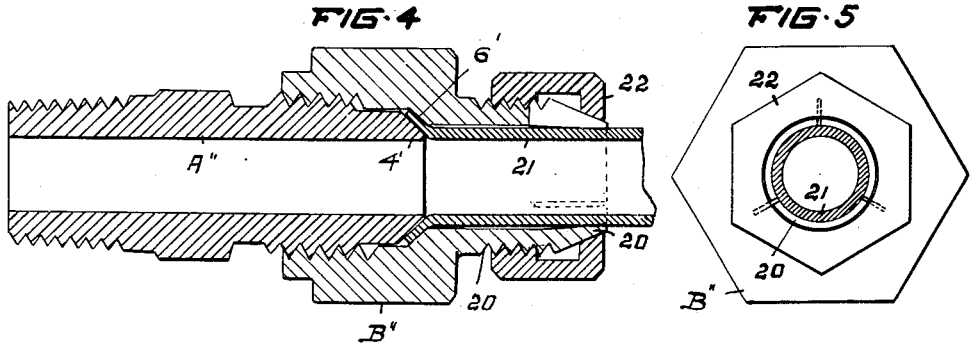
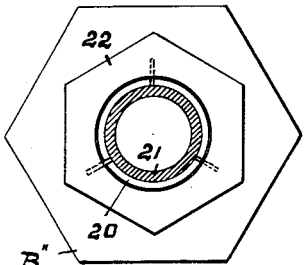
INVENTOR
A. J. WEATHERHEAD JR.
BY
Fisher, Moser + Moore.
ATTORNEY Patented Aug. 16, 1932

1,872,536

UNITED STATES PATENT OFFICE

ALBERT J. WEATHERHEAD, JR., OF CLEVELAND, OHIO

PIPE COUPLING

Application filed December 31, 1930. Serial No. 505,799.

My invention relates to an improvement in pipe couplings, especially screw couplings for flanged pipes or copper tubes which have been flared to provide a clamping flange adapted to connect the pipe or tube to another part with fluid-tight sealing effect. The flange is formed by expanding and stretching the wall of the tube to larger dimensions, say on outwardly flaring lines to an angle of approximately forty-five degrees or less, thus producing an angular bend annularly in the tube. In coupling this tube to another part the flaring extremity or flange is compressed tightly between two clamping surfaces, thus reducing it somewhat in thickness and making it harder while the main body of the tube remains unaltered in thickness and physically. As a result, the resistance to vibration in the tube is lowest at its flared end where clamped within the coupling members, especially at the bend in the tube or at the juncture of the flared portion with the body of the tube. Thus, in using such couplings and tubes where vibration exists or occurs, as in aeroplanes, automobiles, pumps and engines, the tube is more apt to fracture or fail in its flared portion or flared junction than elsewhere, since the flared or flanged end of the tube becomes the center or nodal point or plane of the oscillatory or vibratory movement imparted to the tube. This has been the case heretofore in all screw couplings known to me which include a tubular clamping nut sleeved over the tube. Now my object in general is to provide a coupling for flanged tubes wherein the vibratory or oscillatory movement may be localized in an annular zone in the main body of the tube more or less remotely from its flared end where clamped to the cone in order that such flared portion may be greatly or entirely relieved of the bending stresses and strains induced by vibratory or oscillatory movements between the parts, thereby safeguarding against failure, leakage and breakage at the flare and prolonging the life of the tube and connection. A further object of the present device, yielding additional advantageous result, consists in locking the coupling members together by locking the coupling nut itself to the pipe or tube, all as hereinafter shown and described and more concisely set forth in the claims.

In the accompanying drawing, Fig. 1 is a sectional view of a coupling embodying my invention, including a flared tube clamped therein, and Fig. 2 is an end elevation of the same parts. Figs. 3, 4, and 5 are sectional views of two modified forms of the invention.

The invention, as exemplified in the several figures in the drawing, is embodied in a coupling device comprising a main body or female member A, and a tubular coupling nut or male member B which is provided with external screw-threads 2 adapted to connect with internal screw-threads 3 in the recessed end of body A. As shown in Figs. 1 to 3, body A is formed with a conical seat or cone 4 at the bottom or inner end of the recess against which the expanded flange or flared end 5 of a metal pipe or copper tube C is adapted to be seated. The clamping end of nut B is formed with a flaring mouth 6 the angle of which is either parallel with the angular side of the cone or of slightly differing angle to permit the flared portion or flange 5 of the tube to be clamped tightly with fluid-tight sealing effect against the cone when coupling nut B is screwed home. Nut B is usually provided with a hexagonal enlargement 7 for wrench engagement, and body A is formed internally with a passage 8 extending axially through the cone. Body A may be made in various forms and shapes, and the shape and form of the flange on the tube and its seat in body A may also differ from the showing herein, but in general the description of the coupling up to this point applies to old and well known structures for connecting a flanged pipe or flared tube to another body or part, reference being had for instance to the U. S. patent granted to me for a pipe coupling, Oct. 29, 1929, No. 1,733,923. In Fig. 4 I also show the invention as applied to a pipe coupling of another known type, comprising a main body A″ having a conical extremity 4′ against which the pipe flange or tube flare may be seated and compressed by a screw nut B′ having a flaring seat 6′ internally thereof.

In using such or similar pipe couplings the pipe or tube is usually flared or flanged after the nut has been sleeved over the pipe or tube. To permit the tubular coupling nut to be sleeved readily over the tube, it is customary or requisite that the axial bore in the nut be of slightly larger diameter than the pipe or tube. This variation in diameter may be only 5/1000 to 10/1000 of an inch, but nevertheless with any kind of a sleeved fit the pipe or tube can vibrate or oscillate throughout its length within the tubular nut except where clamped at its flared end against cone 4. To relieve the flared end of the tube of vibratory stresses and strains the coupling nut B or B′ is particularly constructed to be contracted at its outer end until the tube is contracted slightly or gripped tightly in an annular zone apart from the flared end, say substantially as delineated at —a— in Fig. 1. In so doing, a new nodal point, line or plane for vibration is provided, that is to say, by gripping or contracting the tube annularly at another place than at its flared end the bending stresses will be transferred from the flared end and localized in the pliable body of the tube where its physical properties have not been changed or altered by stretching and clamping operations and where no abrupt bend in the wall of the tube is present. Contraction of coupling nut B and gripping of the tube apart from the flared end may be effected in several ways, and in the coupling shown in Fig. 1 this result is accomplished by providing nut B with a screw-threaded clamping extension 9 adapted to receive a second nut or screw-threaded collar 10. By slotting or splitting extension 9 and using taper screw-threads or a tapering nut or collar 10, this part of the coupling may be readily contracted until the tube is tightly gripped and supported therein. In that way, the flared end of the tube is relieved of buckling strains and prevented from breaking under vibration. Also, the coupling nut B is locked to the tube so that it cannot readily rotate, back up and loosen when the parts vibrate or oscillate.

In Fig. 3 I show a modified form of the invention comprising a female coupling or recessed body A′ having a conically formed bottom 11 adapted to seat the flared end or flange 12 of a copper tube 14. The coupling nut B′ in this instance is provided with a screw-threaded cavity 15 within its enlarged outer end 16 wherein a second clamping member or unit 17 may be inserted. This member is in effect a lock nut having a contractible tip or prolongation 18 adapted to grip or clutch the main body of tube 14 rearwardly from its flared end 12, thereby providing an additional or auxiliary support for the tube adapted to relieve the flared end of vibratory strains. The inclined bottom 19 of cavity 15 converges inwardly and forwardly so that the yielding prolongation 18 or member C is easily crowded annularly against the body of tube 14 when nut 17 is screwed tightly into coupling member B′. Prolongation 18 may be beveled and slotted to promote such contraction thereof, and clamping of the tube at this point may be limited to a tight clutching action or increased in greater degree to the extent of slightly contracting the body of the tube, if desired. In that way the main coupling member B′ and tube 14 may be locked tightly together so that the coupled parts will not become disconnected by vibration, and more especially, so that the nodal line of vibratory movements of the tube will be located in the body of the tube instead of at the flared end of the tube.

Another form of pipe coupling is shown in Fig. 4, the members A″ and B″ being constructed according to known and accepted practices, excepting that the female coupling member B″ in this case includes a screw-threaded extension 20 having radial slots to permit it to be readily contracted to clutch the body of tube 21 when a beveled clamping nut or collar 22 is screwed inwardly over extension 20. The tube is thus locked and supported at the outer end of coupling nut B″ in somewhat the same way and with the same results as in the coupling device shown in Figs. 1 and 2.

The different structures shown and described herein serve to exemplify that the invention may be readily embodied in other forms and types of couplings for pipes or tubes which are flanged, flared or otherwise constructed to provide a coupling joint, and that the invention viewed broadly resides in providing such couplings with a simple and effective means for clamping and supporting the pipe or tube additionally within the coupling itself apart from its joint to safeguard against fracture, breakage, and leakage when the tube or coupling is subjected to vibration or oscillatory movement.

What I claim is:

1. A pipe coupling, comprising male and female screw threaded members having cooperating clamping seats for clamping the flared end of a pipe therebetween, the male member including a screw threaded cavity within its enlarged outer end, and a second male member screwed into said cavity and including a contractible tip adapted to grip the pipe within said first male member.

2. A pipe coupling, comprising male and female screw threaded members having cooperating clamping seats for clamping the flared end of a pipe therebetween, the male member including a screw threaded cavity having an inclined, inwardly and forwardly converging bottom, and a second male member screwed into said cavity and including a slotted contractible tip cooperating with said converging bottom in gripping the pipe withing said first male member.

In testimony whereof I affix my signature.

ALBERT J. WEATHERHEAD, Jr.